United States Patent
Irvin et al.

(10) Patent No.: US 11,638,147 B2
(45) Date of Patent: Apr. 25, 2023

(54) PRIVACY-PRESERVING COLLABORATIVE WHITEBOARD USING AUGMENTED REALITY

(71) Applicant: International Business Machines Corporation, Armonk, NY (US)

(72) Inventors: Allison Irvin, West Melbourne (AU); Filiz Isabell Kiral, Melbourne (AU); Lenin Mehedy, Doncaster East (AU); Nicholas Waywood, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 16/691,833

(22) Filed: Nov. 22, 2019

(65) Prior Publication Data

US 2021/0160693 A1  May 27, 2021

(51) Int. Cl.
| | | |
|---|---|---|
| *H04W 12/06* | (2021.01) | |
| *G06T 11/60* | (2006.01) | |
| *G06T 11/00* | (2006.01) | |
| *H04W 12/50* | (2021.01) | |
| *H04L 65/75* | (2022.01) | |
| *H04L 67/131* | (2022.01) | |
| *G06F 3/01* | (2006.01) | |
| *H04L 67/306* | (2022.01) | |
| *H04W 4/20* | (2018.01) | |

(52) U.S. Cl.
CPC .......... *H04W 12/06* (2013.01); *G06T 11/001* (2013.01); *G06T 11/60* (2013.01); *H04L 65/75* (2022.05); *H04L 67/131* (2022.05); *H04W 12/50* (2021.01); *H04L 67/306* (2013.01); *H04W 4/20* (2013.01)

(58) Field of Classification Search
CPC ....... H04W 12/06; H04W 12/50; H04W 4/20; G06T 11/001; G06T 11/60; H04L 65/601; H04L 67/38; H04L 67/306
See application file for complete search history.

(56) References Cited

U.S. PATENT DOCUMENTS 7,119,819 B1 * 10/2006 Robertson ........... G06F 3/04815
715/848
7,542,040 B2 * 6/2009 Templeman ............ G06T 13/40
345/474

(Continued)

FOREIGN PATENT DOCUMENTS

WO  2019005706 A1  1/2019

OTHER PUBLICATIONS

"CollabHub Virtual Whiteboard", printed on Aug. 12, 2019, 3 pages, <https://www.collabhubvr.com/>.

(Continued)

*Primary Examiner* — Nicholas Augustine
(74) *Attorney, Agent, or Firm* — Stephen R. Yoder (57) ABSTRACT

Providing a method for secure collaboration amongst professionals so that the contents of a collaborative work session are only seen and accessed by those professionals who are authorized to view the contents. A privacy-preserving whiteboard device, along with a set of Augmented Reality (AR) Headsets that are securely and communicatively connected to the privacy-preserving whiteboard device are used to ensure the confidentiality of the contents of the collaboration session.

18 Claims, 5 Drawing Sheets

(56) References Cited

U.S. PATENT DOCUMENTS

| | | | |
|---|---|---|---|
| 9,122,321 | B2 | 9/2015 | Perez |
| 9,244,533 | B2* | 1/2016 | Friend .................. G09B 21/009 |
| 9,696,795 | B2* | 7/2017 | Marcolina ............... G06F 3/011 |
| 9,996,797 | B1* | 6/2018 | Holz ..................... G06F 3/0304 |
| 10,516,853 | B1* | 12/2019 | Gibson .................. H04N 7/157 |
| 2012/0249741 | A1* | 10/2012 | Maciocci ............. G06T 19/006 348/51 |
| 2014/0082526 | A1* | 3/2014 | Park ..................... H04L 65/403 715/757 |
| 2014/0282105 | A1* | 9/2014 | Nordstrom .............. G06F 3/016 715/753 |
| 2015/0143459 | A1* | 5/2015 | Molnar ................... H04L 67/02 726/2 |
| 2017/0011227 | A1 | 1/2017 | Tse |
| 2017/0185261 | A1* | 6/2017 | Perez .................. G06F 3/04845 |
| 2017/0243403 | A1* | 8/2017 | Daniels .................. G06T 19/20 |
| 2018/0131907 | A1* | 5/2018 | Schmirler ............ G06T 19/006 |
| 2018/0197313 | A1 | 7/2018 | Chakravorty |
| 2018/0357472 | A1* | 12/2018 | Dreessen ................. G06T 7/20 |
| 2019/0004622 | A1 | 1/2019 | O'Brien |
| 2019/0087015 | A1* | 3/2019 | Lam ...................... A63F 13/213 |
| 2019/0310757 | A1* | 10/2019 | Lee ........................ G06F 3/017 |
| 2019/0361694 | A1* | 11/2019 | Gordon ................ G06F 1/3231 |
| 2020/0110928 | A1* | 4/2020 | Al Jazaery ............. G06F 3/017 |
| 2020/0117267 | A1* | 4/2020 | Gibson .................. G06F 3/011 |
| 2020/0117270 | A1* | 4/2020 | Gibson .................. G06T 17/00 |
| 2020/0309944 | A1* | 10/2020 | Thoresen ............. G06T 19/006 |
| 2020/0368616 | A1* | 11/2020 | Delamont ............. A63F 13/213 |
| 2021/0008413 | A1* | 1/2021 | Asikainen .......... A63B 24/0087 |
| 2021/0041951 | A1* | 2/2021 | Gibson .................... G06T 7/74 |

OTHER PUBLICATIONS

"Digital Collaboration With a Whiteboard in Virtual Reality", Springer, First Online: Oct. 18, 2018, 5 pages, <https://link.springer.com/chapter/10.1007/978-3-030-02686-8_72>.

"Luidia Smartmarker", © Copyright 2019, Luidia, Inc., 7 pages, <https://www.luidia.com/smartmarker/>.

"VR Conferencing and Collaboration for training and education", Rumii, printed on Aug. 12, 2019, 6 pages, <https://www.rumii.net/product/features>.

Gunther et al., "MAPVI: Meeting Accessibility for Persons With Visual Impairments", Petra '19, Jun. 5-7, 2019, Rhodes, Greece, 10 pages.

Rich, Jason R., "Etiquette and Strategies for Real-Time Collaboration | How to Become More Efficient by using Cloud Computing", Jan. 26, 2018, 6 pages, <http://www.informit.com/articles/article.aspx?p=2832584&seqNum=3>.

Stearns et al., "Design of an Augmented Reality Magnification Aid for Low Vision Users", Assets '18, Oct. 22-24, 2018, Galway Ireland, 12 pages.

Turcich, Timothy, "AR Whiteboard Concept", YouTube, Sep. 14, 2018, 2 pages, <https://www.youtube.com/watch?v=gRjgdGDaeak>.

* cited by examiner

USER 1: PROPOSED IDEA CONTENT A

USER 2: COMMENTS ON PROPOSED IDEA CONTENT A

USER 3: PROPOSED IDEA CONTENT B

USER 4: COMMENTS ON PROPOSED IDEA CONTENT B

USER 5: QUESTION(S) ABOUT PROPOSED IDEA CONTENT B

USER 3: ANSWER TO QUESTION(S) ABOUT PROPOSED IDEA CONTENT B

PRIVACY-PRESERVING COLLABORATIVE WHITEBOARD USING AUGMENTED REALITY

BACKGROUND

The present invention relates generally to the field of augmented reality, and more particularly to a collaborative implementation of a physical device using augmented reality.

The term "Augmented Reality" is known. As of Nov. 7, 2019, the Wikipedia entry for "Augmented Reality" states as follows: "Augmented reality (AR) is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that fulfills three basic features: a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. Augmented reality is related to two largely synonymous terms: mixed reality and computer-mediated reality."

SUMMARY

According to an aspect of the present invention, there is a method, computer program product and/or system that performs the following operations (not necessarily in the following order): (i) receiving, from a first user, a request to pair the first AR Headset that is respectively associated with the first user for a first work session to the first privacy-preserving whiteboard device; (ii) pairing, by an authentication module of the privacy-preserving whiteboard device, the first AR Headset to the first privacy-preserving whiteboard device so that the first AR Headset is registered as an authorized user of the privacy-preserving whiteboard device during the first work session; (iii) subsequent to the pairing of the first AR Headset to the privacy-preserving whiteboard device, recording, by the privacy-preserving whiteboard device, a first audio content created by the first user; (iv) recording, by the privacy-preserving whiteboard device, a first visual content created by the first user; and (v) storing, by the privacy-preserving whiteboard device, the first audio content and the first visual content.

DETAILED DESCRIPTION

Some embodiments of the present invention are directed to providing a method for secure collaboration amongst professionals so that the contents of a collaborative work session are only seen and accessed by those professionals who are authorized to view the contents. In some embodiments of the present invention, a privacy-preserving whiteboard device, along with a set of Augmented Reality (AR) Headsets that are securely and communicatively connected to the privacy-preserving whiteboard device are used to ensure the confidentiality of the contents of the collaboration session.

This Detailed Description section is divided into the following subsections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
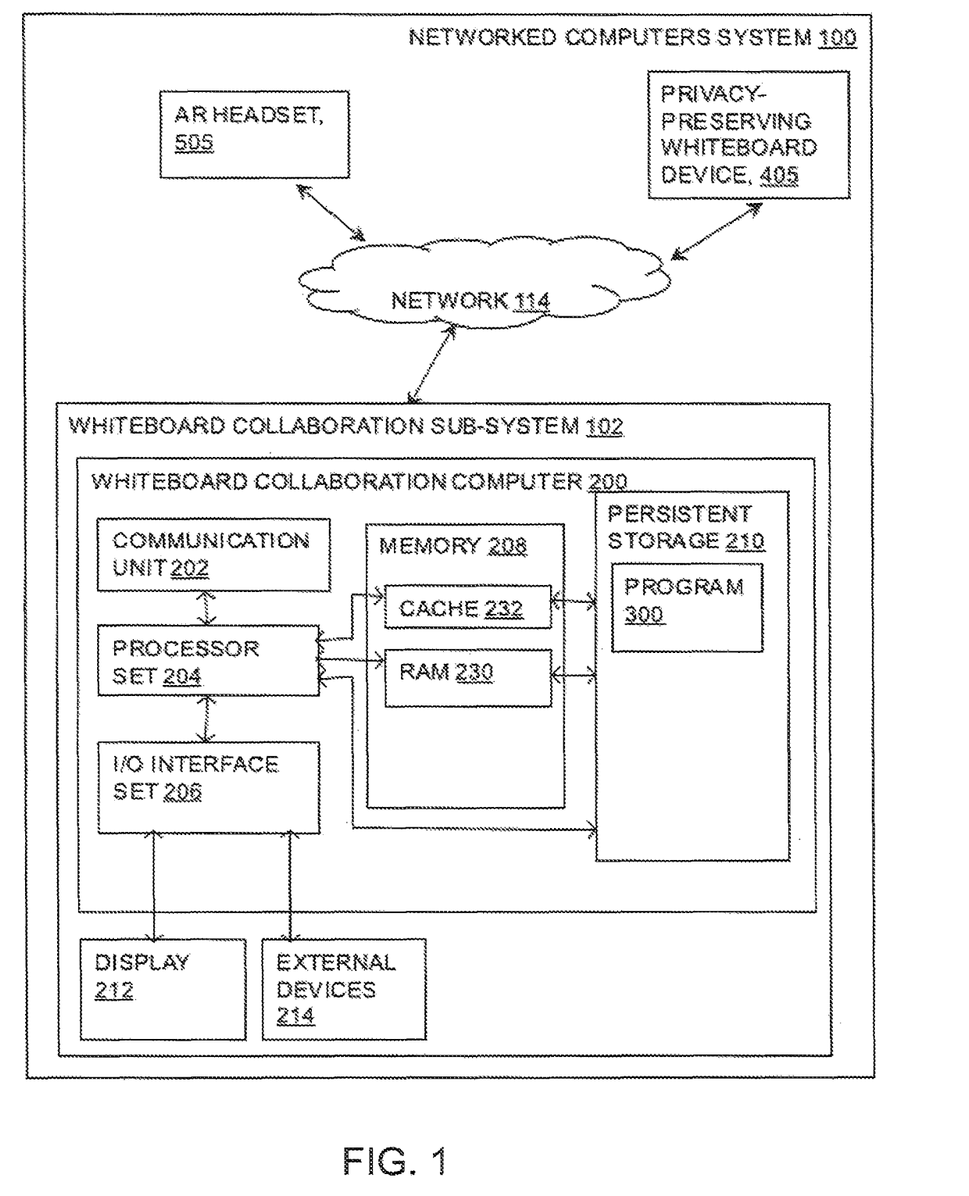
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: whiteboard collaboration subsystem 102 (sometimes herein referred to, more simply, as subsystem 102); AR headset 505; privacy-preserving whiteboard device 405; and communication network 114. Whiteboard collaboration subsystem 102 includes: whiteboard collaboration computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
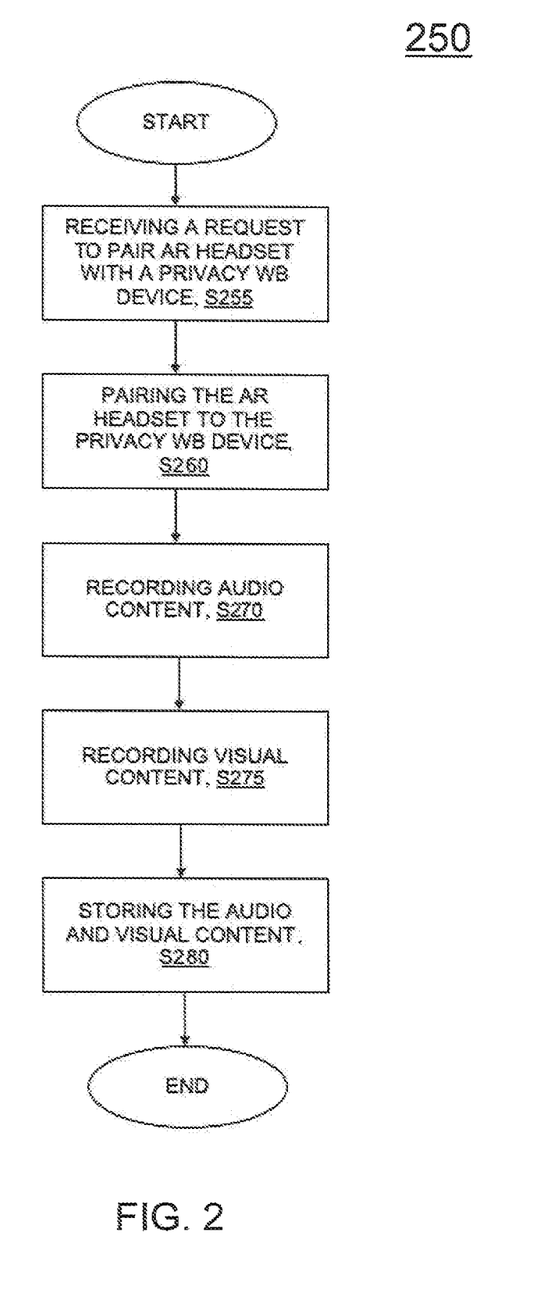
FIG. 2 is a flowchart showing a first embodiment method performed, at least in part, by the first embodiment system.
Figure 3:
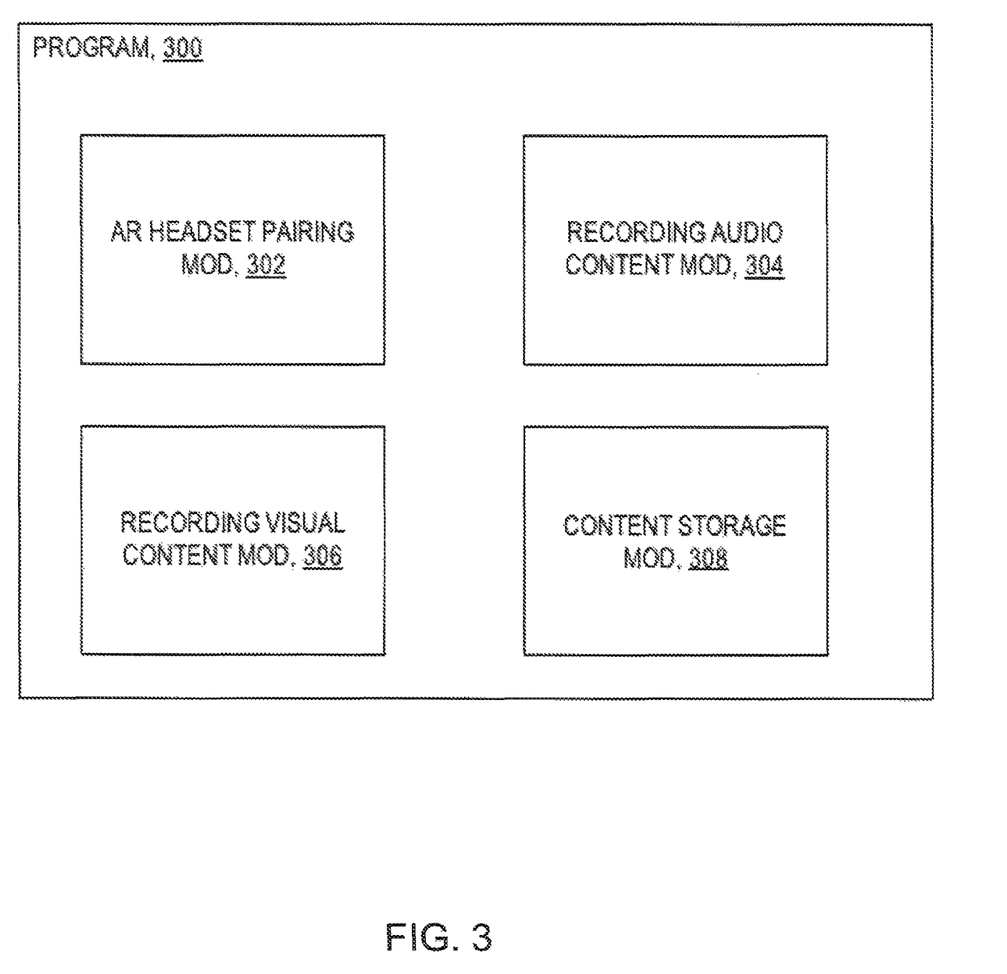
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Figure 5:
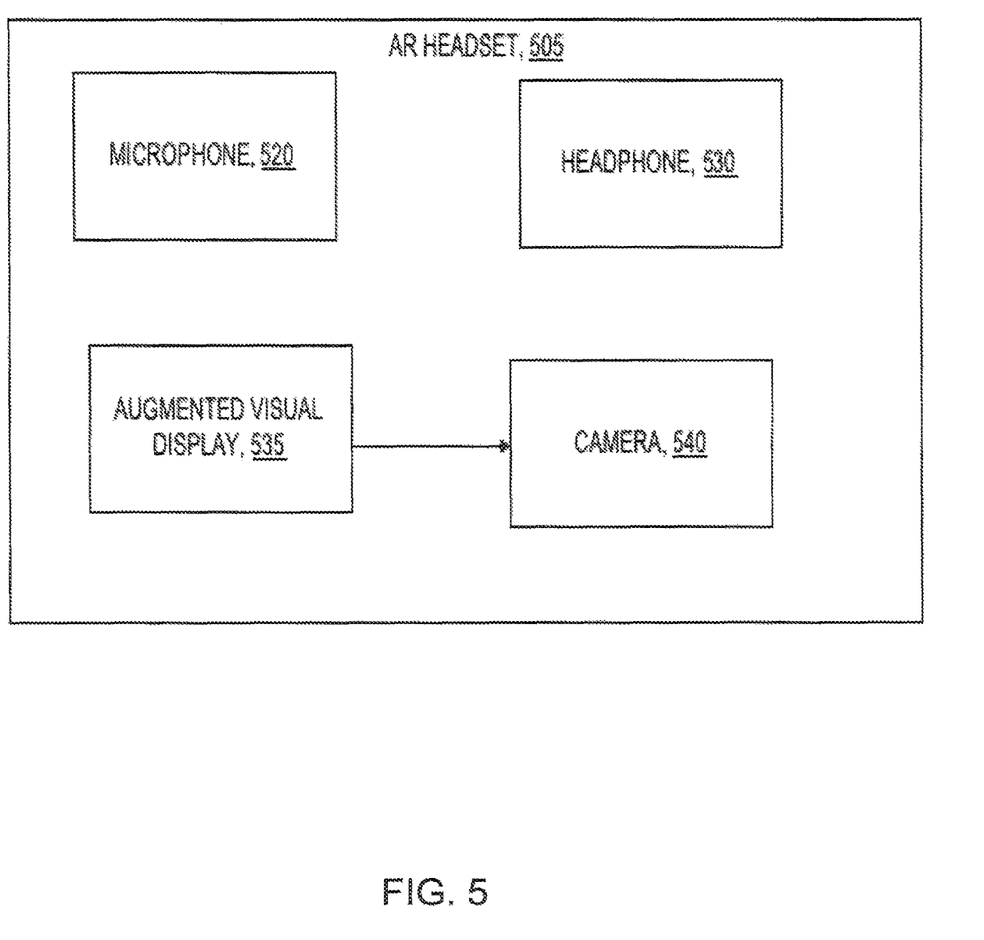
FIG. 5 is a functional block diagram depicting a first embodiment of an Augmented Reality (AR) Headset according to the present invention.

Prior to discussing the operations of flowchart 250, embodiments of AR Headset 505 (which will be extensively referenced in connection with the operations of flowchart 250) will now be discussed.

AR Headset 505, as shown in FIG. 5, includes microphone 520, headphone 530, augmented visual display 535, and camera 540.

Microphone 520 is a sound recording device that is designed to receive sounds that are detected from a user's present environment. In some embodiments of the present invention, microphone 520 can be a directional microphone that can detect and receive sounds coming from a multitude of directions with respect to a fixed position of microphone 520. Alternatively, microphone 520 can be a non-directional microphone, which detects and collects sounds from a specific direction.

Headphone 530 is a sound delivery device that is capable of delivering sound to the user. In some embodiments of the present invention, headphone 530 is a wearable audio delivery device including at least one ear cup, and the ear cup can deliver sound to the user. In some embodiments of the present invention, headphone 530 can deliver to the user either naturally occurring sounds from the user's present environment, reproduced sounds, or digitally generated sounds. For example, headphone 530 can deliver sounds that are generated during a given work session and can provide sounds of recorded audio content from the given work session at a later point in time.

Augmented visual display 535 is a type of digital visual display that is capable of displaying the images, live video captured by camera 540, and/or recorded video captured by camera 540.

Camera 540 is an image capturing device for recording visual images or videos in the form of a single photograph or a plurality of video signals. In some embodiments of the present invention, camera 540 includes the following camera types: action camera, animation camera, autofocus camera, backup camera, body camera, box camera, camera phone, closed-circuit television camera, canon camera, digital camera, field camera, helmet camera, light-field camera, multiplane camera, or any other type of camera that is now known or later created. In some embodiments of the present invention, camera 540 is used to capture live video so that this captured video can be played back for a given authorized user at a later point in time.

Figure 4:
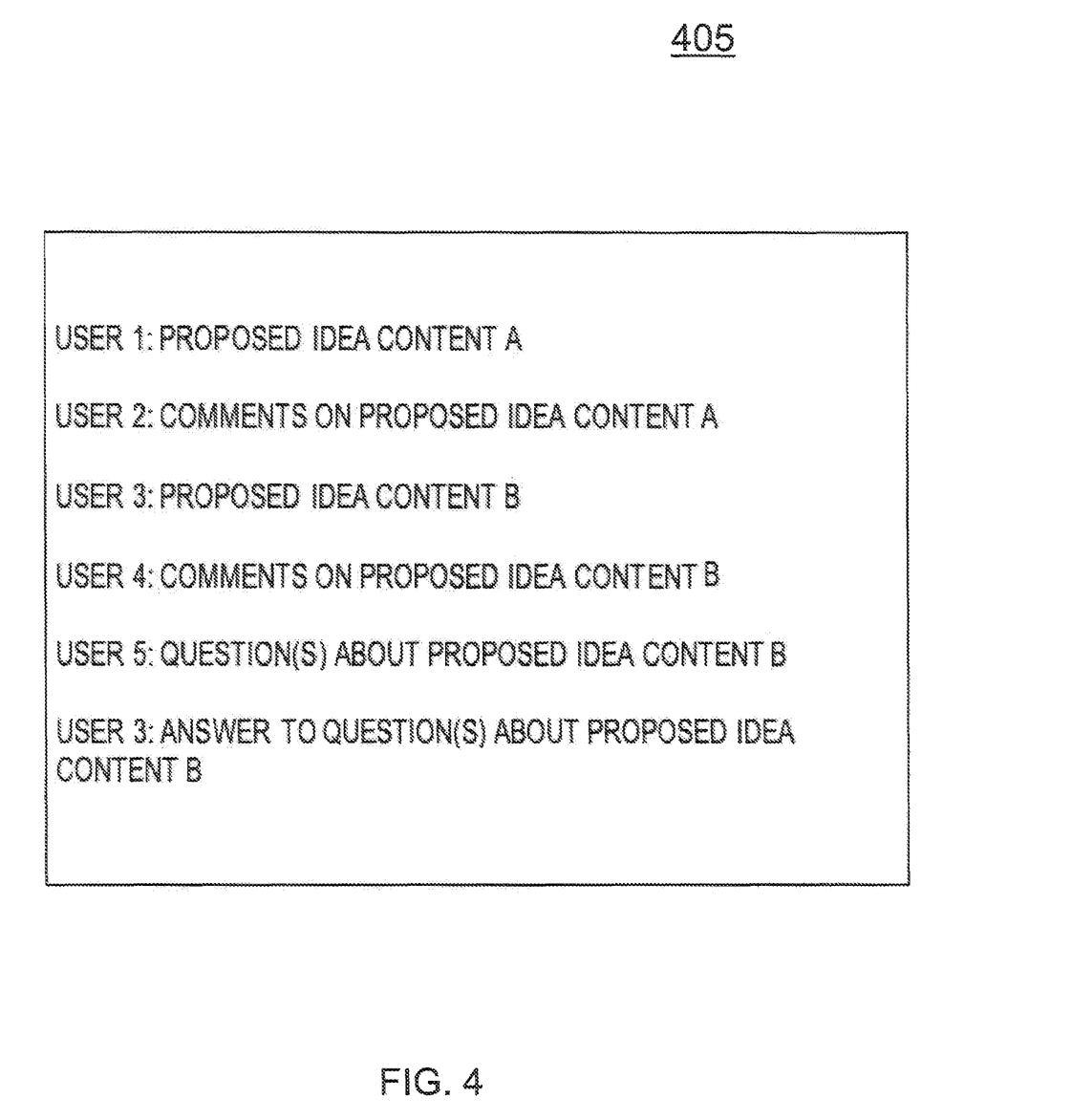
FIG. 4 is a functional block diagram depicting a first embodiment of a collaborative whiteboard device according to the present invention.

Processing begins at operation S255, where AR Headset pairing module ("mod") 302 receives a first request to pair an AR Headset (such as AR Headset 505, shown in FIGS. 1 and 5) to a privacy-preserving whiteboard device (such as privacy-preserving whiteboard device 405, shown in FIGS. 1 and 4). In one embodiment, the first request to pair the AR Headset to the privacy-preserving whiteboard device can be initiated by the first user after the first user physically wears the AR Headset. Alternatively, the first request to pair the AR Headset to the privacy-preserving whiteboard device can be automatically initiated by the machine-logic of the AR Headset when a given user authenticates himself or herself as an authorized user of the AR Headset.

Processing proceeds to operation S260, where AR Headset pairing mod 302 pairs the AR Headset with the privacy-preserving whiteboard device. Once this pairing operation is complete, the first user (who is wearing the AR Headset) becomes an authorized user having the requisite permissions to view, create, and modify content that is ultimately drawn on the privacy-preserving whiteboard. A second user, who is not an authorized user (that is, the second user is wearing an AR Headset but has not paired his or her AR Headset to the privacy-preserving whiteboard) but is in the vicinity of the privacy-preserving whiteboard, is unable to see the content that is drawn onto the privacy-preserving whiteboard. In some embodiments, the first user can be made an administrator of a given work session, and can manually grant or deny permissions of subsequent users who attempt to pair their AR Headsets with the privacy-preserving whiteboard during the given work session. Alternatively, subsequent users who attempt to pair their AR Headsets to the privacy-preserving whiteboard can do so by entering an automatically generated password that is created at the time that the given work session is scheduled.

Processing proceeds to operation S265, where recording audio content mod 304 records audio content that is created by either the first user, or a different user that is authorized to be a part of the given work session (that is, a user that has successfully paired his or her AR Headset to the privacy-preserving whiteboard during the given work session). In some embodiments, although the audio content is not necessarily displayed on the whiteboard device, it is recorded nonetheless so that the fullness of the given work session can be recorded. That is, the recorded audio content can be later accessed (as described below in connection with operation S275) to allow an authorized user to recollect certain details of the work session that were not written down, or to allow an authorized user to provide fuller context to the discussion during the first work session.

Processing proceeds to operation S270, where recording visual content mod 306 records visual content that is created by either the first user or another authorized user. An example of operation S270 in a collaborative setting will now be discussed with reference to privacy-preserving whiteboard 405 as shown in FIG. 4. In this example, five authorized users are collaborating on a confidential project. Each of the five users are able to provide input on two proposed ideas. Here, user 1 proposes an idea for "content A" which can only be seen by the five authorized users. User 2 is able to write down his or her comments about content A so that the other users can provide their opinions on the content. User 3 proposes an idea for "content B," an alternative idea to content A. User 4 is able to write down his or her comments about content B so that the other users can provide their opinions on the content. User 5, who does not fully understand content B, writes a question about content B, to which user 3 provides a written answer. It is important to note that during the recording of this visual content (that is, the written proposed ideas, comments to the proposed ideas, and questions/answers to the comments to the proposed ideas), recording audio content mod 304 is simultaneously recording any spoken communication from the authorized users. This is done so that when any of the five authorized users in this example need to refer to the contents of the work session at a later time, they are able to access the contents of the work session with the full context of the work session.

In this example, each of the five users are able to write down his or her proposals, comments, questions and/or answers to the comments using a proprietary smart marker that is capable of tracking and transmitting back to the AR Headset of the users. It should be further emphasized that the written content created by each of the five users in this example, while using the proprietary smart marker, cannot be seen by a non-authorized user (that is, only the users whose AR Headsets are granted the requisite permissions to view the written content on the privacy-preserving whiteboard device can see the written content during the given collaboration).

In some embodiments of the present invention, the five users do not need to be in the same geographical region. That is, each of the five authorized users in this example can remotely login to a separate privacy-preserving whiteboard device. Each of these whiteboard devices are capable of being configured so that they can sync and transmit the written content that is created to each of the authorized users so that the five authorized users can collectively see the content that the group has created. It should be emphasized that while each of the five authorized users are creating written content on each of their respective whiteboard devices while using the proprietary smart marker, only the authorized users can see the written content that is created. This alleviates the potential privacy concerns that users may have when remotely collaborating on a project that includes confidential information.

Alternatively, in some embodiments of the present invention, the five users can use the proprietary smart marker to write on a surface that is not the privacy-preserving whiteboard device (such as a wall, table, floor, door, or any other surface where the proprietary smart marker can track written content and transmit that written content to the AR Headset of an authorized user).

Processing proceeds to operation S275, where content storage mod 308 stores the recorded audio and visual content that is created (as discussed above with respect to operations S265 and S270). In some embodiments of the present invention, content storage mod 308 stores the recorded audio and visual content to a storage repository (such as persistent storage 210, shown in FIG. 1). Alternatively, content storage mod 308 can temporarily store the entirety of the recorded audio and visual content (or store certain specified portions of the recorded audio and visual content, as determined by an authorized user) in cache for easy and fast retrieval of that content (such as cache 232, shown in FIG. 1). Alternatively, content storage mod 308 can store the recorded audio and visual content directly to a physical storage location on AR Headset 505 (not shown in this example).

III. FURTHER COMMENTS AND/OR EMBODIMENTS

Some embodiments of the present invention recognize the following facts, potential problems and/or potential areas for improvement with respect to the current state of the art: (i) when working on research, innovation, or client projects in shared workspaces, it is important to be aware of privacy considerations; (ii) while conventional whiteboards are useful tools to work collaboratively, they often need to be kept in secure spaces (visually and acoustically shielded) and need to be wiped after a session; (iii) conventional whiteboards, and sometimes even digital whiteboards, do not necessarily address the problem of keeping confidential information that is written on them obscured from those who are not authorized to view such confidential information; (iv) different users may have different needs and preferences when it comes to whiteboard sketches and the general progression of a given meeting; (v) in one example, a group of users may have a color vision deficiency; (vi) in a second example, conventional whiteboards only capture a small part of the meeting content, with no context given (that is, shorthand language is used to truncate the content of the meeting, and this truncated content is not necessarily understood by all of the meeting participants).

Some embodiments of the present invention may include one, or more, of the following operations, features, characteristics and/or advantages: (i) uses personalized user settings to allow for users with difference accessibility requirements to configure their views; (ii) incorporates user authentication to ensure that only people who are granted access are able to participate; and/or (iii) records sessions to determine which users were in attendance at any given meeting (this feature is important in meetings where attributing proof of authorship to a given meeting participant is critical).

Some embodiments of the present invention may include one, or more, of the following operations, features, characteristics and/or advantages: (i) uses a privacy-preserving and customizable whiteboard using augmented reality (AR) headsets that have microphones; (ii) drawings on the whiteboard display are recorded simultaneously with the audio; (iii) the drawings made on the whiteboard display are not openly displayed on the whiteboard for the casual observer to see; (iv) instead, a certain level of permission (to be set by a group administrator before starting the drawings) is required to view the content drawn on the whiteboard display; (v) communicates the content drawn on the whiteboard display to any headset with the correct permissions; and/or (vi) uses augmented reality headsets to display the drawings to the user wearing the headset having the requisite permissions.

Some embodiments of the present invention may include one, or more, of the following operations, features, characteristics and/or advantages: (i) configures the individual user's preferences and needs, particularly with respect to making the audio and visual recording accessible; (ii) allows for the audio recording to be automatically transcribed into subtitles for the users who are hard of hearing; (iii) adjusts colors for users with color vision deficiency; (iv) adjusts contrast and zoom levels for users with low or otherwise limited vision; and/or (v) at a later point in time, allows authenticated users with the correct permissions to access the recording(s) while listening to the synced audio recording and/or reading subtitles.

Some embodiments of the present invention may include one, or more, of the following operations, features, characteristics and/or advantages: (i) allows for privacy of the audio and visual content being created during a given presentation using the privacy-preserving whiteboard; (ii) allows for the content to be readily accessed and/or shared by the users who have the requisite permissions to access that content; (iii) allows for private collaboration of a group of authorized people while visually shielding the work product from unauthorized people in a shared environment space; (iv) records sessions for later review; and/or (v) the technical implementation enables customization of the content to account for vision and hearing impairments for certain users.

Some embodiments of the present invention will now be illustrated by the following scenario. In this scenario, there are four users (Allison, Nick, Isabell, and Leonard) that are collaborating on a project that involves private, sensitive, and/or confidential information. Nick is hard of hearing and Isabell has a color-vision deficiency, which makes the colors red and green look like the same color to her. The four users could not find a room on their secure floor, so they decided to meet in an agile meeting area that has a privacy-preserving and accessible digital whiteboard installed.

Allison is starting the meeting by inviting all participants to authenticate their headsets for the session. Isabell's user profile that is stored on the system is aware of her color-vision deficiency. Therefore, when different colors are used during the work session, her customized personal color palette is used (that is, when the colors red and green are used by the other users, the colors red and green are automatically changed to different colors that are chosen by Isabell). During the work session, Leonard decides to zoom in on certain details and changes the background color to a light yellow in order to reduce eye strain. Additionally during the work session, Nick sees a transcription of his colleagues' words on his display (in his AR headset, such as AR Headset 505).

Individuals that walk by the privacy-preserving whiteboard during the work session are not able to see the written content that is created during that session. After the work session has ended, when Allison tries to summarize the ideas (roughly one week later), she is unsure about a particular detail. To remedy this, she loads up the work session file on the nearest privacy-preserving whiteboard to review the audio and visual contents of the work session to obtain the missing detail.

Some embodiments of the present invention may include one, or more, of the following operations, features, characteristics and/or advantages: (i) at the beginning of a work session, users are able to log in to a specific AR headset and sync with the current session in order to obtain authorization to join and participate in the current session; (ii) by using a stylus pen (and selecting a color), authorized users can then draw on the display; (iii) this drawing is captured through software on the display of the privacy-preserving whiteboard and transmitted to authorized devices only; (iv) AR headsets use the information transmitted to them to display all drawings from this current session that is seemingly on the whiteboard display in front of the group; (v) all users are able to see the same content; (vi) users can add private information to the drawings if they choose to; (vii) the current work session is stored and respectively associated with authorized user profiles; and/or (viii) colors can be dynamically changed in order to help users with any color-vision deficiency.

Some embodiments of the present invention may include one, or more, of the following operations, features, characteristics and/or advantages: (i) the AR headsets record the audio conversation from the current work session and associates the recorded audio session with the current work session; (ii) these conversations could also be converted to text in order to assist users that are hearing impaired; (iii) since each session is stored with set authorization for its users, the users can retrieve the drawings any time, either by displaying them using an AR headset or by exporting them to image files; (iv) users can set the configuration of their AR headsets that are associated with their user profile; (v) configurable settings for the users AR headsets include at least contrast, color palette, and/or zoom level; and/or (vi) some or all of the authorized users can collaborate remotely during the current work session using the same system, where each user is able to draw on a privacy-preserving whiteboard that is accessible to the user.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
providing a first privacy-preserving whiteboard device, with the first privacy-preserving whiteboard device having a capability to communicatively connect to a first Augmented Reality (AR) Headset;
receiving, from a first user, a request to pair the first AR Headset that is respectively associated with the first user for a first work session to the first privacy-preserving whiteboard device;
pairing, by an authentication module of the privacy-preserving whiteboard device, the first AR Headset to the first privacy-preserving whiteboard device so that the first AR Headset is registered as a first authorized user of the privacy-preserving whiteboard device during the first work session;
subsequent to the pairing of the first AR Headset to the privacy-preserving whiteboard device, recording, by the privacy-preserving whiteboard device, a first audio content created by the first user and a first visual content created by the first user, with the first visual content only being displayed to authorized users of the privacy-preserving whiteboard device;
storing, by the privacy-preserving whiteboard device, the first audio content and the first visual content;
sending, by the authentication module of the privacy-preserving whiteboard device, a permission access key to a second user, the permission access key authorizing the second user as a second authorized user of the privacy-preserving whiteboard device;
using, by the second user, the permission access key as the second authorized user to gain access the privacy-preserving whiteboard device; and
accessing, by the second user, the first audio content created by the first user and the first visual content created by the first user, with a zoom level of the first visual content created by the first user being in a form that is configurable by the first user and the second user, and with the first audio content being customizable by the second user in order to meet auditory requirements of the second user.

2. The CIM of claim 1 further comprising:
pairing, by the authentication module of the privacy-preserving whiteboard device, a second AR Headset to the privacy-preserving whiteboard device so that the second AR Headset is registered as the second authorized user of the privacy-preserving whiteboard device subsequent to the completion of the first work session; and
subsequent to the pairing of the second AR Headset to the privacy-preserving whiteboard device, retrieving, by the second user, the first audio content and the first visual content.

3. The CIM of claim 1 further comprising:
prior to the recording of the first visual content created by the first user, selecting, by the first user, a first color from a set of colors based, at least in part, on the personal preferences of the first user.

4. The CIM of claim 2 wherein the retrieved first audio content and the retrieved first visual content is heard and displayed by the second user on the second AR Headset.

5. The CIM of claim 2 wherein:
the retrieved first audio content is played on the AR Headset for a predetermined period of time; and
the number of times the retrieved first audio content can be re-retrieved is determined by an administrator having control during the first work session.

6. The CIM of claim 2 wherein:

the retrieved first visual content is displayed on the AR Headset for a predetermined period of time; and the number of times the retrieved first visual content can be re-retrieved is determined by an administrator having control during the first work session.

7. A computer program product (CPP) comprising:
a machine readable storage device; and
computer code stored on the machine readable storage device, with the computer code including instructions and data for causing a processor(s) set to perform operations including the following:
  receiving, from a first user, a request to pair the first AR Headset that is respectively associated with the first user for a first work session to the first privacy-preserving whiteboard device,
  pairing, by an authentication module of the privacy-preserving whiteboard device, the first AR Headset to the first privacy-preserving whiteboard device so that the first AR Headset is registered as a first authorized user of the privacy-preserving whiteboard device during the first work session,
  subsequent to the pairing of the first AR Headset to the privacy-preserving whiteboard device, recording, by the privacy-preserving whiteboard device, a first audio content created by the first user and a first visual content created by the first user, with the first visual content only being displayed to authorized users of the privacy-preserving whiteboard device,
  storing, by the privacy-preserving whiteboard device, the first audio content and the first visual content,
  sending, by the authentication module of the privacy-preserving whiteboard device, a permission access key to a second user, the permission access key authorizing the second user as a second authorized user of the privacy-preserving whiteboard device,
  using, by the second user, the permission access key as the second authorized user to gain access the privacy-preserving whiteboard device, and
  accessing, by the second user, the first audio content created by the first user and the first visual content created by the first user, with a zoom level of the first visual content created by the first user being in a form that is configurable by the first user and the second user, and with the first audio content being customizable by the second user in order to meet auditory requirements of the second user;
  wherein the first privacy-preserving whiteboard device has a capability to communicatively connect to a first Augmented Reality (AR) Headset.

8. The CPP of claim 7 further comprising:
pairing, by the authentication module of the privacy-preserving whiteboard device, a second AR Headset to the privacy-preserving whiteboard device so that the second AR Headset is registered as the second authorized user of the privacy-preserving whiteboard device subsequent to the completion of the first work session; and
subsequent to the pairing of the second AR Headset to the privacy-preserving whiteboard device, retrieving, by the second user, the first audio content and the first visual content.

9. The CPP of claim 7 further comprising:
prior to the recording of the first visual content created by the first user, selecting, by the first user, a first color from a set of colors based, at least in part, on the personal preferences of the first user.

10. The CPP of claim 8 wherein the retrieved first audio content and the retrieved first visual content is heard and displayed by the second user on the second AR Headset.

11. The CPP of claim 8 wherein:
the retrieved first audio content is played on the AR Headset for a predetermined period of time; and
the number of times the retrieved first audio content can be re-retrieved is determined by an administrator having control during the first work session.

12. The CPP of claim 8 wherein:
the retrieved first visual content is displayed on the AR Headset for a predetermined period of time; and
the number of times the retrieved first visual content can be re-retrieved is determined by an administrator having control during the first work session.

13. A computer system (CS) comprising:
a processor(s) set;
a machine readable storage device; and
computer code stored on the machine readable storage device, with the computer code including instructions and data for causing the processor(s) set to perform operations including the following:
  receiving, from a first user, a request to pair the first AR Headset that is respectively associated with the first user for a first work session to the first privacy-preserving whiteboard device,
  pairing, by an authentication module of the privacy-preserving whiteboard device, the first AR Headset to the first privacy-preserving whiteboard device so that the first AR Headset is registered as a first authorized user of the privacy-preserving whiteboard device during the first work session,
  subsequent to the pairing of the first AR Headset to the privacy-preserving whiteboard device, recording, by the privacy-preserving whiteboard device, a first audio content created by the first user and a first visual content created by the first user, with the first visual content only being displayed to authorized users of the privacy-preserving whiteboard device,
  storing, by the privacy-preserving whiteboard device, the first audio content and the first visual content,
  sending, by the authentication module of the privacy-preserving whiteboard device, a permission access key to a second user, the permission access key authorizing the second user as a second authorized user of the privacy-preserving whiteboard device;
  using, by the second user, the permission access key as the second authorized user to gain access the privacy-preserving whiteboard device; and
  accessing, by the second user, the first audio content created by the first user and the first visual content created by the first user, with a zoom level of the first visual content created by the first user being in a form that is configurable by the first user and the second user, and with the first audio content being customizable by the second user in order to meet auditory requirements of the second user.

14. The CS of claim 13 further comprising:
pairing, by the authentication module of the privacy-preserving whiteboard device, a second AR Headset to the privacy-preserving whiteboard device so that the second AR Headset is registered as the second authorized user of the privacy-preserving whiteboard device subsequent to the completion of the first work session; and subsequent to the pairing of the second AR Headset to the privacy-preserving whiteboard device, retrieving, by the second user, the first audio content and the first visual content.

15. The CS of claim 13 further comprising:
prior to the recording of the first visual content created by the first user, selecting, by the first user, a first color from a set of colors based, at least in part, on the personal preferences of the first user.

16. The CS of claim 14 wherein the retrieved first audio content and the retrieved first visual content is heard and displayed by the second user on the second AR Headset.

17. The CS of claim 14 wherein:
the retrieved first audio content is played on the AR Headset for a predetermined period of time; and
the number of times the retrieved first audio content can be re-retrieved is determined by an administrator having control during the first work session.

18. The CS of claim 14 wherein:
the retrieved first visual content is displayed on the AR Headset for a predetermined period of time; and
the number of times the retrieved first visual content can be re-retrieved is determined by an administrator having control during the first work session.

* * * * *